United States Patent
Hyde

[15] 3,693,408
[45] Sept. 26, 1972

[54] PIPELINE TESTING PLUG

[72] Inventor: Walter E. Hyde, Duncan, Okla.

[73] Assignee: Halliburton Company, Duncan, Okla.

[22] Filed: Nov. 20, 1970

[21] Appl. No.: 91,450

[52] U.S. Cl.....................................73/49.8, 138/90
[51] Int. Cl................................................G01m 3/28
[58] Field of Search...73/40.5 R, 40.5 A, 40; 138/90, 138/91, 93; 277/1

[56] References Cited

UNITED STATES PATENTS

| 3,561,490 | 2/1971 | Little | 138/90 |
| 2,715,444 | 8/1955 | Fewel | 73/40.5 R X |
| 2,793,524 | 5/1957 | Badger | 73/40.5 R |

*Primary Examiner*—Louis R. Prince
*Assistant Examiner*—William A. Henry, II
*Attorney*—John H. Tregoning

[57] ABSTRACT

A pipeline testing plug with a cylindrical body has scraper cups attached to it, resilient packer ring positioned on the body, a pair of wedges positioned one on each side of the packer ring and a pair of mandrels and jackknife linkage within the body. The mandrels are hydrostatically operated, with the linkage arranged for blocking the first mandrel which is connected to one of the wedges, and the other mandrel being connected to the linkage in order to remove the linkage from blocking the first mandrel in response to applied hydrostatic pressure.

The pipeline plug is inserted into the line and pushed down the line by low-pressure fluid flow. After the plug reaches the desired area, the pipeline is closed off at opposite ends and hydrostatic pressure is built up, activating the plug sealing means. Pressure at both ends of the line is then monitored to determine which section of the line contains the leak. Upon reduction of hydrostatic pressure the sealing means in the plug automatically releases, allowing the plug to be moved to a new position, thereby further narrowing the area in which the leak could be located.

21 Claims, 6 Drawing Figures

INVENTOR
WALTER E. HYDE

INVENTOR
WALTER E. HYDE

ATTORNEY

PIPELINE TESTING PLUG

BACKGROUND OF THE INVENTION

It is well known in the transmission of oil and gas that breaks occur in these pipelines, and it is therefore necessary to find and repair such breaks. It is also well known that newly installed pipelines must be hydrostatically tested prior to being put into service.

Currently, the method followed and apparatus used in testing a buried pipeline either for leaks or for strength is as follows.

As length of pipeline, for example, 10 miles long is isolated physically from the remaining line by use of valves and/or blank flanges. The isolated length is then divided into two equal sections by cutting into and inserting a blank flange at its midpoint. Hydrostatic pressures are raised in each section and are then shut in. With precision instruments, pressures are checked over a period of time and a section having a leak or other defect is detected via a loss of pressure. The next step is to divide the defective section into two 2.5 mile long segments, isolate them with blank flanges, raise the hydrostatic pressures within each, and shut them in. As described above, the pressures are observed and the hunt for the defect is further narrowed. The 2.5 mile segment which had lost pressure is tested by the process described above. This continues until the precise location of the break or leak is found. It is readily apparent that this method is time consuming and expensive.

The instant invention provides a pipeline testing plug which comprises:

a. a cylindrical body having at least one set of annular, resilient, scraper cups positioned on said body, b. an annular resilient packer ring positioned on said body, c. a pair of annular wedges for radially expanding said packer ring, said wedges positioned on said body on either side of said ring, and d. means for moving one of said wedges toward the other of said wedges, said means disposed within said body and including, a first mandrel fixed to one of said wedges and adapted to be movably responsive to hydrostatic pressure, a jackknife operating linkage removably positioned adjacent said first mandrel said linkage blocking movement of said first mandrel, a second mandrel connected to said linkage and adapted to be movably responsive to hydrostatic pressure whereby said second mandrel removes said linkage from blocking said first mandrel.

In order to more fully describe the present invention, reference is made to the accompanying drawings wherein:

FIG. 1 shows the pipeline testing plug constructed in accordance to the present invention;

FIGS. 1a, 1c, and 1d illustrate in detail certain parts of the plug of FIG. 1;

DETAILED DESCRIPTION

Figure 1:
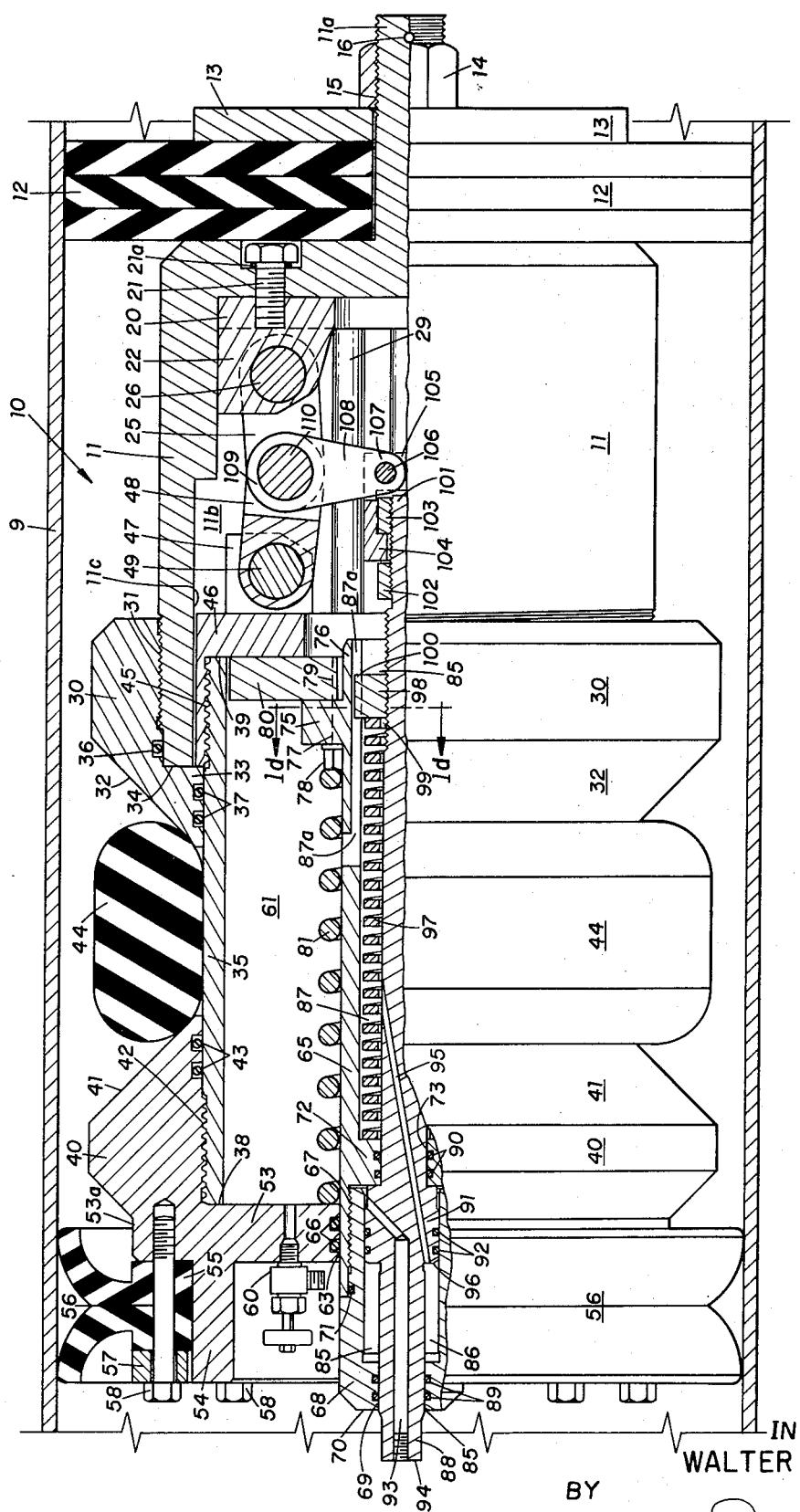
FIG. 1b is a top view of a portion of the plug of FIG. 1.

In FIG. 1 plug 10 is shown in a neutral setting position such as it would appear while being pumped down pipeline 9. The basic component on which plug 10 is constructed is cup-shaped cylinder 11 which includes a shaft 11a projecting rearward (toward the right of FIG. 1). Three resilient scraper discs, collectively numbered 12, are positioned on shaft 11a and held in place by retaining plate 13 and nut 14, the latter being attached to shaft 11a via companion threads 15. Cotter pin 16 prevents the accidental disengagement of nut 14. Discs 12 provide a means to centralize plug 10 within pipeline 9.

Figure 1B:
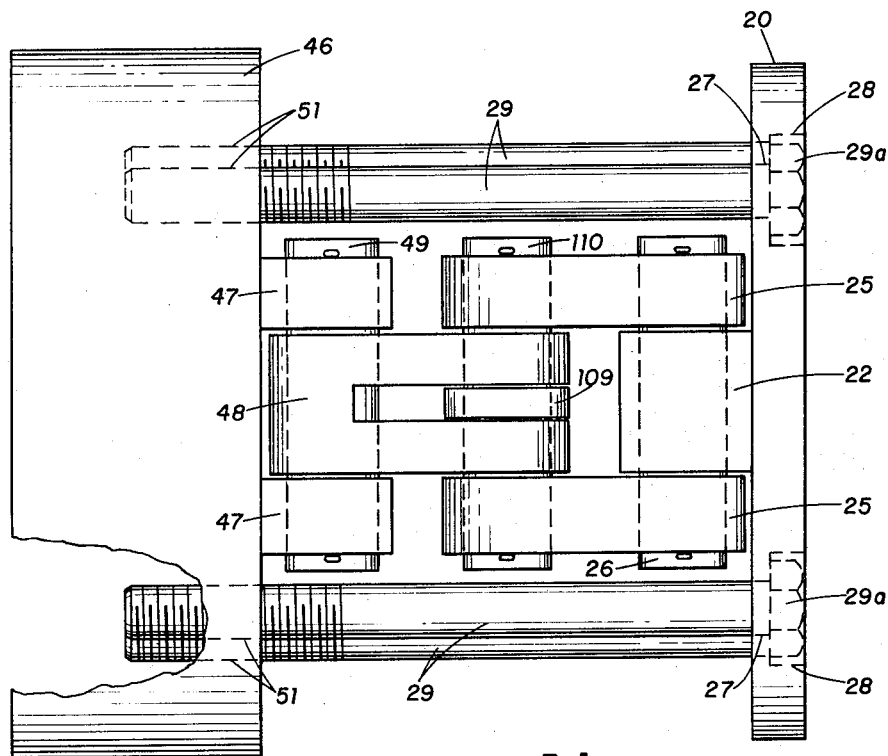
Figure 1C:
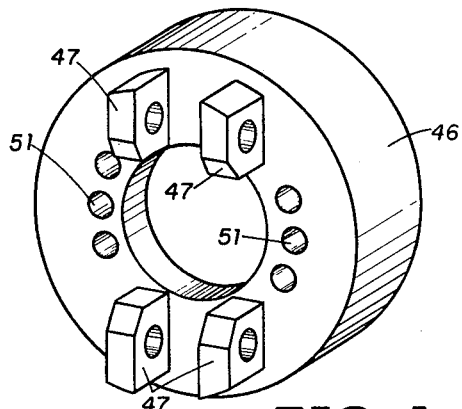
Figure 1D:
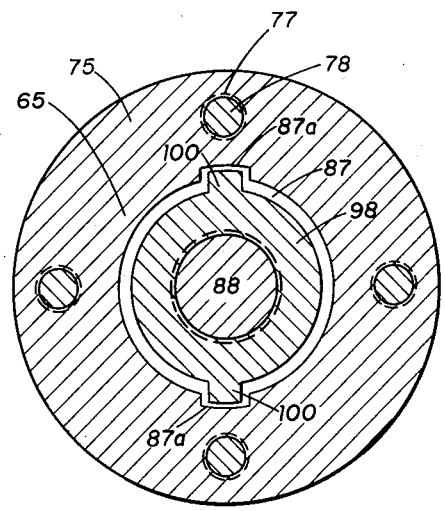
Figure 1A:
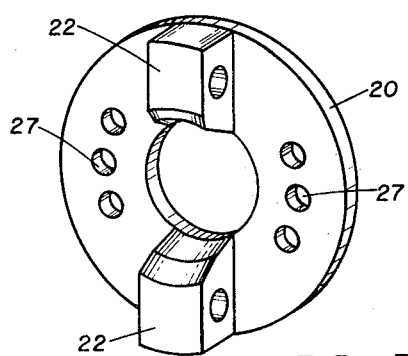

A circular anchor plate 20 is bolted to the interior base of cylinder 11 via bolt 21. Seal 21a provides a fluid tight seal for bolt 21. Plate 20 is better illustrated in FIGS. 1a and 1b. Two anchoring lugs 22 positioned on plate 20 provide pivotal attachment for double link 25 via dowel pin 26. Plate 20 has six holes, collectively numbered 27, bored therethrough as shown in FIG. 1a through which the shanks of six bolts 29 pass. On the reverse side of plate 20 (not shown) a recess, indicated by dashed lines on FIG. 1b and numbered 28, is provided to permit the countersinking of bolt heads 29a. The terminus and function of bolts 29 will be explained further on.

Returning to FIG. 1, a cylindrical shoe 30 is attached to the open end (toward the left of FIG. 1) of cylinder 11 via companion threads 31. Shoe 30 has a wedge face 32 facing forward (toward the left of FIG. 1) and a flange 33 which fits over rim 34 of cylinder 11 and rests slidably against the outer wall of packer ring mandrel 35. O-rings 36 and 37 on shoe 30 and flange 33 respectively, provide sealing means between interior 11b of cylinder 11 and mandrel 35. Parenthetically, all O-rings referred to herein, such as rings 36 and 37, are seated in appropriate recesses in accordance with standard practice in connection with such devices.

Mandrel 35 is a cylindrical shell which, as will be seen below, is slidably mounted on plug 10. Mandrel 35 has a forward end 38 and rearward end 39.

Valve end shoe 40, having a wedge face 41 facing rearward (toward the right of FIG. 1), is attached to mandrel 35, at its forward end 38, via companion threads 42. O-rings 43 on shoe 40 provide sealing means between mandrel 35 and shoe 40. Slidably mounted around mandrel 35, between wedge faces 32 and 41, is resilient annular packer ring 44.

Attached to rearward end 39 of mandrel 35, via companion threads 45, is forward-facing, cup-shaped plate 46. The base and outside of plate 46 is clearly illustrated in FIGS. 1b and 1c. Four anchoring lugs on the base of plate 46, collectively numbered 47, project rearward and provide pivotal attachment for link 48 via dowel pin 49. As does plate 20, plate 46 has six holes, collectively numbered 51, bored therethrough as shown in FIG. 1c and indicated by dashed lines in FIG. 1b. The shanks of bolts 29 pass freely through holes 51, the diameter of the latter being slightly larger than that of the former.

Returning to FIG. 1, note that plate 46 is not exposed on the surface of plug 10, and that its sides are adjacent but do not touch the inner wall 11c of cylinder 11.

Valve end shoe 40 is a rearward facing annular projection of valve end plate 53. A forward facing annular projection 54 is positioned inwardly from outer edge 53a of plate 53 to form step 55 in which is mounted, back to back, a pair of resilient packer cups 56. Mounting is accomplished with support plate 57 and bolts 58 threadedly attached to plate 53. Packer cups 56 provide a surface against which pipeline fluids may push plug 10 from place to place in line 9.

Valve end plate 53 contains a conventional, manually operated high pressure ball valve 60 through which compressed air or nitrogen can be introduced into or out of chamber 61, said chamber defined by mandrel 35, plates 46 and 53. As will become apparent later, chamber 61 is sealed off from the environment without plug 10.

Plate 53 defines bore 63 at its center through which passes tubular housing 65. O-ring seals 66 provide sealing means between plate 53, chamber 61, and housing 65.

Attached to housing 65 via companion threads 67 is annular U-shaped nose cap 68 which contains bore 69 centered in cap 68's base 70. O-ring 71 provides sealing means between housing 65 and nose cap 68.

An interior facing collar 72 within housing 65 defines bore 73 whose diameter is the same as bore 69.

Forming an integral part of housing 65 is ring 75 which is located a short distance to the left of rearward end 76 of housing 65. Spaced 90° apart on ring 75 are four holes 77 through which pass bolts 78. Bolts 78 are threaded into appropriately threaded apertures, indicated by dashed lines 79, in annular backup plate 80 thus securing housing 65 thereto. On the rearward side of plate 80 there are six threaded apertures (not shown) which receive bolts 29. As will be recalled from above, bolts 29 are attached, via plate 20 to cylinder 11. It follows then that via bolts 29, plate 80, and plate 20, housing 65 is rigidly attached to cylinder 11.

Compressed between valve end plate 53 and ring 75 is cylindrical helical retracting spring 81. Spring 81 provides means for storing energy for a purpose which will be discussed hereinafter.

As is apparent, housing 65 and nose cap 68 cooperatively form a continuous passageway 85 running from base 70 of cap 68 to rearward end 76 of housing 65. Defining passageway 85 at its smallest diameter are bores 69 and 73, the former in nose cap 68, the latter in collar 72. Occuring between bores 69 and 73, and having a larger diameter than either, is chamber 86. Another enlarged section, counterbore 87, occurs in housing 65 from collar 72 to rearward end 76. Grooved into counterbore 87 at its rearward end are a pair of opposed slots 87a which can be seen more clearly in FIG. 1d. Counterbore 87 and slots 87a will be referred to below.

Slidably mounted in passageway 85 is control mandrel 88. O-rings 89 positioned on nose cap 70, and O-rings 90 positioned on collar 72 provide sealing means around mandrel 88 so as to isolate chambers 86 and 61 respectively from the environment surrounding plug 10.

Mandrel 88 is formed with upset 91 which is adapted to fit slidably into chamber 86, upset 91's diameter for the most part complementing the diameter of chamber 86. A pair of O-rings 92 on upset 91 provide sealing means between the sections of chamber 86 bisected by upset 91.

Mandrel 88 contains two passages. The first, passage 93, extends from nose 94 rearward through mandrel 88 along the center line until a point is reached within the area defined by upset 91. At that point passage 93 angles outwardly, emerging on the surface of a recessed portion of upset 91. Passage 93 permits pipeline fluids to enter that portion of chamber 86 existing between O-rings 90 and 92, a space that changes in volume as will be discussed hereinafter. The second passage, numbered 95, begins on forward face 96 of upset 91 and angles rearward until it emerges into the area defined by counterbore 87, which space is pressure connected with chamber 61. Passage 95 connects the portion of chamber 86 existing between O-rings 89 and 92 to chamber 61 and chamber 11b which is defined by interior walls 11c of cylinder 11 and plate 46.

Cylindrical helical spring 97, encircling mandrel 88, is compressed between collar 72 and adjusting nut 98. Nut 98 is attached to mandrel 88 via companion threads 99. Referring now to FIG. 1d, it is seen that nut 98 contains a pair of lugs 100 oppositely spaced and adapted to fit slidably into slots 87a grooved into housing 65. Via this arrangement, spring 97 can be compressed or loosened by simply rotating mandrel 88.

Referring again to FIG. 1, attached to rearward end 101 of mandrel 88 is a pair of nuts numbered 102 and 103, which are spaced apart to accommodate flange 104 which is part of yoke 105.

Pivotally attached to yoke 105 by pin 106 is lower end 107 of transverse link 108. Upper end 109 of link 108 is pivotally attached to links 25 and 48 via pin 110. This latter arrangement can also be seen in FIG. 1b.

SUMMARY OF COMPONENTS

The various components of plug 10 can be separated into four groups.

The first group is composed of all those major components which are connected rigidly to each other and form the foundation of plug 10. There is no movement of this group except as plug 10 moves. The major components included therein are cylinder 11, anchor plate 20, cylindrical shoe 30, housing 65 and nose cap 68.

The second group of major components is rigidly connected to each other and as a unit, is slidably mounted on the first group. The major components forming this unit are packer ring mandrel 35, plate 46, and valve end plate 53.

The third group is composed of parts which are latched together and as a unit, slide along passageway 85. This group includes control mandrel 88 and yoke 105.

The fourth group of parts which form a unit are pivotally connected to each other and to each of the preceding three groups. These parts are the three links 25, 48, and 108.

For reasons that will be apparent subsequently, the second group can be referred to as the telescoping unit, the third group as the tripping unit, and the fourth group as the blocking unit.

OVERALL MODE OF OPERATION

Figure 2:
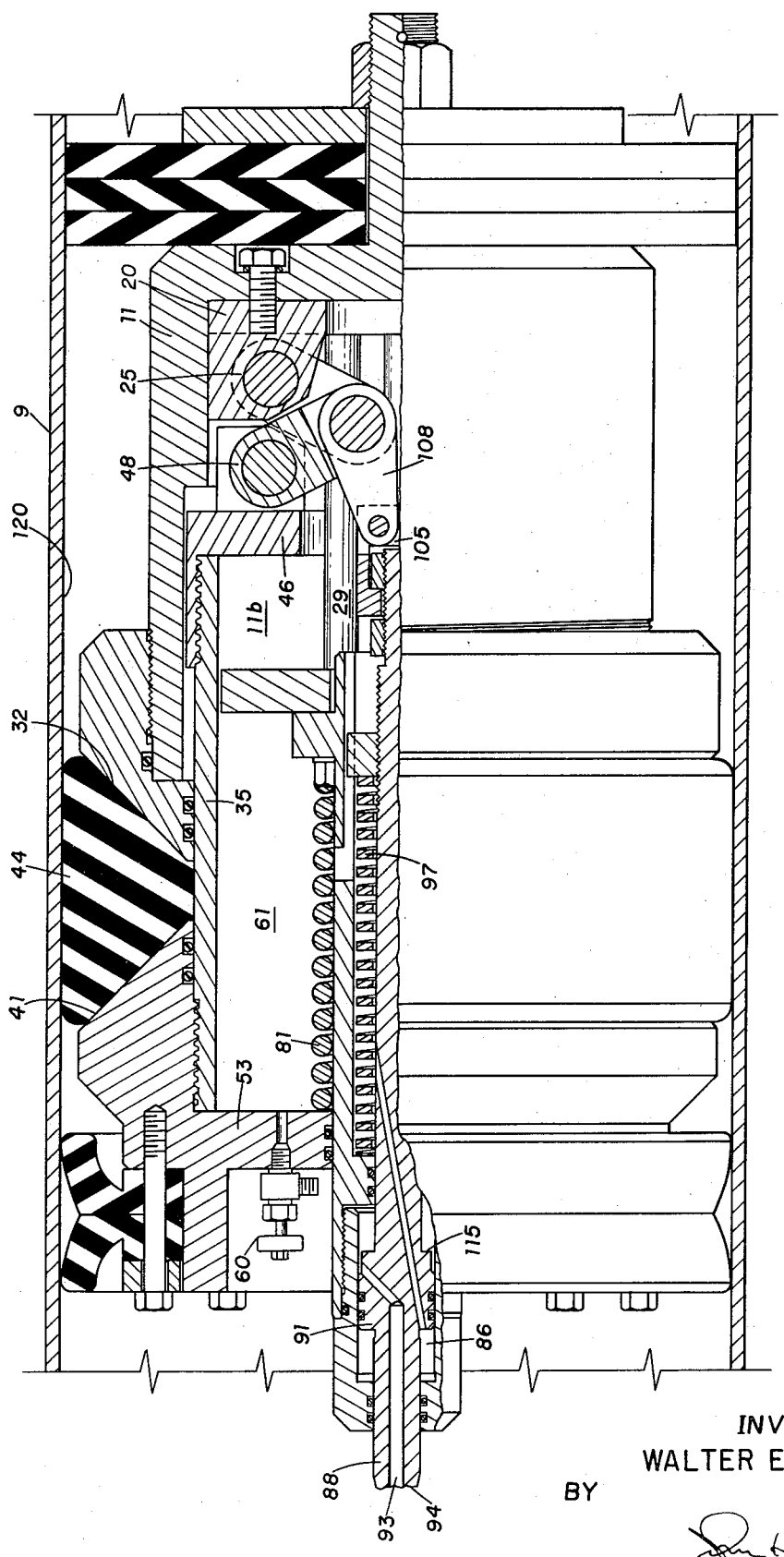
FIG. 2 shows the plug of FIG. 1 set in its operational position in a pipeline.

In describing the operation of plug 10, reference will be made to FIG. 2 to aid in the explanation.

For the purpose of explaining the operation of the instant invention, assume a 10 mile section of pipeline 9 is to be tested to find a leak. The line is cut into at either end (not shown) of the 10 mile length and suitable valves and pumping equipment are installed. Plug 10 with its interior chambers 11b, 61, and 86 at atmospheric pressure, is placed into line 9 at the upstream end. Valves at the downstream end are opened and pumping commences. Plug 10 is pushed along by the pumping fluid acting on packer cups 56. In order to determine plug 10's position, one of two methods can be used; a radio transmitter (not shown) can be attached to plug 10 and location spotted via signals therefrom to a radio receiver; alternatively the volume of fluid displaced at the downstream end can be metered and plug 10's location calculated in that manner. It is suggested that both methods be used jointly to pinpoint plug 10's location to within 1 or 2 feet.

When it has been determined that plug 10 has reached the midpoint, i.e., 5 miles from its starting point, valves at the downstream end are closed. Fluid and plug movement ceases and the hydrostatic pressure within pipeline starts to rise as pumping continues. The hydrostatic pressure acts against the exterior of plug 10 and also against rearward wall 115 of upset 91 via passage 93. Since the cross sectional area of wall 115 exceeds the cross sectional area of nose 94 of mandrel 88, and since the portion of chamber 86 forward of upset 91 is at atmospheric pressure, mandrel 88 will tend to move forward. Resisting this however is spring 97.

Hydrostatic pressure is also pushing on plug 10 attempting to shorten it. Resisting this force are links 25 and 48 which act as a rigid bar as long as transverse link 108 remains in a 90° position (FIG. 1) relative to the longitudinal axis of plug 10. Links 25 and 48, as a rigid bar, hold plate 46 and attached components, i.e., the telescoping unit, from moving toward plate 20.

Finally the hydrostatic pressure builds up to where it overcomes the resistance offered by spring 97 and mandrel 88 moves forward dragging yoke 105 with it. Transverse link 108, pivotally attached to yoke 105, is pulled downward and out of its 90° blocking position. At that instance the rigidity of links 25 and 48 is destroyed and the telescoping unit, being urged by the hydrostatic pressure, moves rearward further into cylinder 11. The actual force causing the telescoping is the product of the cross sectional area of the outside diameter of packer ring mandrel 35 minus the cross sectional area of the outside diameter of spring housing 65 times the hydrostatic pressure. Wedge 41 as part of the telescoping unit moves rearward also toward stationary wedge 32. Packer ring 44, positioned between wedges 41 and 32 is compressed laterally and expanded radially into sealing engagement with interior wall 120 of pipeline 9.

As is apparent, as the telescoping unit moving rearward it compresses spring 81.

The pumps at the end of pipeline 105 are stopped and pressures in both sections of line are carefully watched. The section having a leak will soon be known as the pressure therein will begin to decrease. At that time, pressure throughout line 9 will be bled-down and equalized at both ends. As pressures drop, spring 81 restores mandrel 35, plate 46, and valve end plate 53 to their original position (FIG. 1). Spring 97 similarly restores control mandrel 88 to its original position.

These two movements return links 25, 48, and 108 to their position as shown in FIG. 1. The sealing engagement between packer ring 44 and wall 120 is released and plug 10 is free to be pumped to a new point midway into the section containing the leak. Note that plug 10 can be moved and actuated irrespective of the direction it is facing. Once plug 10 is in its new position, packer ring 44 is again expanded and the two new sections pressure tested. The procedure is repeated until the precise location of the leak is found.

Because pipelines follow the surface of the earth, it is not uncommon for a point of a line to be considerably higher or lower than another point only a short distance away. This elevation change may cause premature setting of plug 10 because of the residual hydrostatic pressure due to elevation. Such residual hydrostatic pressure can be determined before testing of the pipeline begins and this residual pressure can be offset by pressuring-up chambers 11b, 61, and 86 (in front of upset 91) with nitrogen or compressed air via valve 60 to the same pressure. Thus, plug 10 will not be accidentally actuated into sealing engagement as it travels through the lower sections of the pipeline because the interior pressure of plug 10 will be equal to the residual hydrostatic pressure outside of plug 10.

From the foregoing, it will be apparent to those experienced in pipeline testing that the instant invention provides an inexpensive means for locating leaks and for testing pipeline quality. No longer will it be necessary to repeatedly cut into a pipeline in order to find a leak or to test its strength. Thus, the integrity of the line is preserved.

It is also apparent that the use of the present invention can be accomplished by relatively inexperienced and unskilled workmen. Further, it is apparent that the operation can be done rapidly, thus presenting a considerable savings in time. Another feature of the present invention is that the surface of the ground and crops growing thereon at the location of the leak only will need be disturbed.

The operation described above utilized one plug, and indeed, only one plug is required. However, those experienced in pipeline testing will easily be able to conceive situations where two or more plugs, each set to trip at a different pressure, can be used in one operation.

Although the invention has been described with reference to the embodiment illustrated, it will be appreciated by those skilled in the art that additions, modifications, substitutions, deletions, and other changes not specifically described may be made which fall within the spirit of the invention as defined in the following claims.

What is claimed is:

1. A pipeline testing plug, which comprises:
   a. a cylindrical body having at least one set of annular, resilient, scraper cups positioned on said body;
   b. an annular resilient packer ring positioned on said body;
   c. a pair of annular wedges for radially expanding said packer ring, said wedges positioned on said body on either side of said ring; and
   d. means for moving one of said wedges toward the other of said wedges, said means disposed within said body and including, a first mandrel fixed to one of said wedges and adapted to be movably responsive to hydrostatic pressure, a jackknife operating linkage removably positioned adjacent said first mandrel said linkage blocking movement of said first mandrel, a second mandrel connected to said linkage and adapted to be movably responsive to hydrostatic pressure whereby said second mandrel removes said linkage from blocking said first mandrel.

2. A pipeline plug for use in testing pipelines and the like, which comprises:
   a. an elongated, cylindrical body having at least one resilient disc positioned thereon;
   b. a first annular wedge fixed on one end of said body;
   c. an elongated cylindrical shell telescopingly assembled with said body;
   d. a second annular wedge fixed on said shell;
   e. a resilient packer ring slidably positioned on said shell between said first and said second wedges;
   f. a jackknife operating linkage removably positioned between said body and said shell, said linkage blocking telescoping movement of said body and said shell; and
   g. a mandrel slidably positioned within said body and said shell, said mandrel adapted to remove said linkage from blocking telescoping movement of said body and said shell.

3. A plug assembly adapted to be pumped through a pipeline for establishing a temporary seal therein, comprising:
   a. a horizontally elongated tubular body structure having a first cylindrical wedge positioned thereon and at least one annular, resilient, scraper disc positioned on one end thereof;
   b. a first mandrel defining a central passageway, said first mandrel movably assembled in telescoping relation to said body structure, said first mandrel movable in response to fluid pressure;
   c. at least one resilient packer cup positioned on one end of said first mandrel;
   d. a second cylindrical wedge positioned on said first mandrel;
   e. a resilient sealing ring slidably mounted on said first mandrel, said ring positioned between said first and said second wedges;
   f. a plurality of links pivotally attached to each of said body structure and said first mandrel, and to each other, said links operable to block telescoping movement of said assembled body structure and said first mandrel;
   g. a tubular housing positioned in said central passageway in said first mandrel, said housing fixed to said body structure;
   h. a second mandrel adapted to be movably responsive to fluid pressure, said second mandrel slidably mounted in said housing and pivotally attached to said plurality of links, said second mandrel operable to collapse said links permitting telescoping movement of said assembled body structure and said first mandrel, whereby said second wedge moves toward said first wedge deforming said resilient sealing ring into sealing engagement with the interior walls of the pipeline;
   i. spring means for retracting said first mandrel from said body structure to relieve deformation of said resilient sealing ring from sealing engagement with said interior walls;
   j. reservoir means carried by said assembled body structure and said first mandrel and said housing; and
   k. valve means for introducing compressed fluid into said reservoir means.

4. A method of establishing a temporary seal in a pipeline containing fluid, which comprises the steps of:
   a. pumping a plug having an expandable packer ring thereon, into a portion of a pipeline having an opened valve at the opposite end;
   b. closing said valve;
   c. increasing hydraulic pressure in said pipeline by continued pumping; and
   d. expanding said packer ring into sealing engagement with said pipeline is response to said increased hydraulic pressure in said pipeline.

5. The method according to claim 4 wherein said packer ring expansion occurs at a predetermined hydraulic pressure.

6. A method of establishing a seal in a fluid filled pipeline, which comprises the steps of:
   a. placing a plug having an expandable packer ring thereon into a pipeline, said pipeline having a pump at one end and a valve at the other end;
   b. opening said valve in said pipeline;
   c. pumping said plug partially down said pipeline;
   d. closing said valve;
   e. continuing pumping; and
   f. raising pipeline fluid pressure in response to said continued pumping. expanding said expandable packer ring in sealing relation with said pipeline in response to said raising pipeline fluid pressure.

7. The method of claim 6 further characterized by the additional first step of introducing compressed fluid into the interior of a plug.

8. The method according to claim 6 wherein said packer ring expansion occurs at a predetermined pipeline fluid pressure.

9. A plug for use in effecting a seal in a pipe, which comprises:
   a. first conduit means;
   b. second conduit means telescopingly assembled with said first conduit means, said second conduit means movable in response to hydraulic pressure;
   c. a resilient packer ring on said second conduit means;
   d. a pair of wedge means, each positioned on either side of said packer ring, one of said wedge means fixed to said first conduit means, the other of said wedge means fixed to said second conduit means;
   e. blocking means for blocking telescoping action of said second conduit means;
   f. release means, operable in response to hydraulic pressure, for removing said blocking means permitting telescoping action by second conduit means whereby said wedge means, approaching each other, radially expand said packer ring in sealing engagement with the pipe;
   g. first neutral positioning means for retracting said second conduit means and said release means; and h. second neutral positioning means for retracting said release means whereby said blocking means are restored.

10. The plug of claim 9 wherein:
   a. at least one resilient packer disc is positioned on one end of said first conduit means; and
   b. at least one packer cup is positioned on one end of said second conduit means.

11. The plug of claim 10 wherein said at least one packer cup is resilient.

12. The plug of claim 9 wherein said blocking means includes a plurality of links pivotally attached to said first and second conduit means and to said release means and to each other.

13. The plug of claim 9 wherein:
   a. said second conduit means include a central bore; and
   b. a housing positioned in said central bore, said housing defining an internal passageway including restrictive means therein, said passageway adapted to receive said release means.

14. The plug of claim 9 wherein said release means include a mandrel having an upset thereon.

15. The plug of claim 14 wherein said mandrel includes:
   a. a plurality of passages therein; and
   b. means for adjusting said second neutral positioning means.

16. The plug of claim 9 wherein said first and second conduit means define an interior chamber.

17. The plug of claim 16 wherein said second conduit means include valve means for introducing compressed fluid into said interior chamber.

18. A method of establishing two or more temporary seals in a fluid filled pipe, which comprises the steps of:
   a. placing a plurality of plugs in spaced relation in a pipe, said pipe having a valve at one end and a pump at another end, said plugs having expandable packer rings thereon;
   b. opening said valve in said pipe;
   c. pumping said plugs in spaced relation, down said pipe;
   d. closing said valve;
   e. continuing pumping; and
   f. raising pipe fluid pressure in response to said continued pumping, expanding said expandable packer rings in sealing engagement with said pipe in response to said raising pipe fluid pressure.

19. A method for locating leaks in a pipeline comprising:
   a. placing one or more expandable plugs in the pipeline;
   b. flowing fluid into said pipeline to move the plugs along the pipeline into spaced relationship whereby the section of pipeline to be tested is divided by the plugs into two or more lengths;
   c. filling the pipeline completely with fluid;
   d. closing off the opposite ends of the pipeline to be tested;
   e. applying pressure to the fluid in the pipeline at either or both ends of the line so that the pressure throughout the entire pipeline is substantially even, thereby actuating said plugs into sealing arrangement with said pipeline;
   f. measuring the pressure in each individual length of the section of pipeline to be tested over a sufficient period of time to determine which length contains the leak; and
   g. repeating said process until the location of the leak is narrowed down sufficiently to repair the leak.

20. The method of locating leaks in a pipeline as in claim 19 wherein said one or more plugs are placed into the pipeline in a spaced relationship so as to divide said pipe section into two or more substantially identical lengths.

21. The method of locating leaks in a pipeline as in claim 20 wherein the number of plugs used is one and the plug is placed substantially halfway down the length of pipeline to be tested.

* * * * *